（12) United States Patent
Messner et al.

(10) Patent No.: US 10,938,213 B2
(45) Date of Patent: Mar. 2, 2021

(54) POWER TRANSMISSION VIA A BIPOLAR HIGH-VOLTAGE DC TRANSMISSION LINK

(71) Applicant: SIEMENS AKTIENGESELLSCHAFT, Munich (DE)

(72) Inventors: Johann Messner, Erlangen (DE); Nicolas Soellner, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/766,440

(22) PCT Filed: Nov. 22, 2017

(86) PCT No.: PCT/EP2017/080112
§ 371 (c)(1),
(2) Date: May 22, 2020

(87) PCT Pub. No.: WO2019/101307
PCT Pub. Date: May 31, 2019

(65) Prior Publication Data
US 2020/0389031 A1    Dec. 10, 2020

(51) Int. Cl.
*H02J 3/18* (2006.01)
*H02M 7/757* (2006.01)
(Continued)

(52) U.S. Cl.
CPC ............... *H02J 3/36* (2013.01); *H02J 3/18* (2013.01); *H02M 7/7575* (2013.01); *H02M 1/42* (2013.01)

(58) Field of Classification Search
CPC ........ H02J 3/18; H02J 3/20; H02J 3/22; H02J 3/36; H02M 1/42; H02M 7/7575; H02M 7/77
See application file for complete search history.

(56) References Cited

U.S. PATENT DOCUMENTS 3,829,759 A * 8/1974 Thorborg ............... H02M 7/515
                                                           323/207
4,133,026 A * 1/1979 Hausler ..................... H02J 3/36
                                                           363/49
(Continued)

FOREIGN PATENT DOCUMENTS

DE    1588750 A1    1/1970
DE    2705242 A1    8/1978
(Continued)

*Primary Examiner* — Fred E Finch, III
(74) *Attorney, Agent, or Firm* — Laurence Greenberg; Werner Stemer; Ralph Locher

(57) ABSTRACT

A converter station includes two line-commutated converters for energy transmission through a bipolar high voltage direct current transmission link. The two converters are electrically connected in an anti-parallel circuit to the same pole of the high-voltage direct current transmission link. One of the converters is operated as a rectifier in an AC grid and the other converter is operated as an inverter in the AC grid. A station reactive power exchanged by the converter station with the AC grid is controlled by real power stipulations for converter real powers which are exchanged between the converters and the AC grid. A method for operating the converter station is also provided.

1 Claim, 5 Drawing Sheets

(51) Int. Cl.
*H02J 3/36* (2006.01)
*H02M 1/42* (2007.01)

(56) References Cited

U.S. PATENT DOCUMENTS

| | | | | |
|---|---|---|---|---|
| 4,173,780 A | * | 11/1979 | Hausler | H02J 3/36 |
| | | | | 363/35 |
| 4,837,671 A | * | 6/1989 | Wild | H02M 7/7575 |
| | | | | 363/35 |
| 4,888,674 A | * | 12/1989 | Weibelzahl | H02J 3/36 |
| | | | | 363/35 |
| 2010/0046255 A1 | * | 2/2010 | Paajarvi | H02J 3/36 |
| | | | | 363/35 |
| 2015/0256093 A1 | * | 9/2015 | Gupta | H02M 7/521 |
| | | | | 363/35 |
| 2018/0097450 A1 | * | 4/2018 | Andersson | H02M 7/46 |

FOREIGN PATENT DOCUMENTS

| | | |
|---|---|---|
| EP | 0290914 A1 | 11/1988 |
| EP | 0321823 A1 | 6/1989 |
| EP | 3109463 A1 | 12/2016 |

* cited by examiner

POWER TRANSMISSION VIA A BIPOLAR HIGH-VOLTAGE DC TRANSMISSION LINK

BACKGROUND OF THE INVENTION

Field of the Invention

The invention relates to a converter station for a power transmission via a bipolar high-voltage DC transmission link and to a method for operating same.

Electric power between AC grids over long distances is frequently transmitted using high DC voltage, since power transmission using DC voltage exhibits lower losses and is cheaper in comparison with power transmission using AC voltage over long distances. This type of power transmission is referred to as high-voltage DC (HVDC) transmission. The power transmission can take place via a monopolar or bipolar high-voltage DC transmission link (HVDC link). A monopolar HVDC link has only one high-voltage line, to which a high voltage with reference to a ground potential is applied. A bipolar HVDC link has two high-voltage lines, a high voltage that is positive with reference to a ground potential being applied to one high-voltage line and a high voltage that is negative with reference to the ground potential being applied to the other high-voltage line. The parts of an HVDC link that are assigned to the same voltage polarity are referred to below as poles of the HVDC link. A monopolar HVDC link therefore has one pole and a bipolar HVDC link has two poles.

In order to connect an HVDC link to an AC grid, the AC grid and one end of the HVDC link have a converter station arranged between them in which the conversion between AC current and AC voltage of the AC grid and DC current and DC voltage of the HVDC link takes place. Converter stations have one converter for each pole of the HVDC link that is connected to them, said converter frequently being embodied as a thyristor-based line-commutated converter (LCC). In contrast to a self-commutated converter (VSC—voltage sourced converter), a line-commutated converter requires reactive power from the AC grid in order to operate. The reactive power exchanged by a line-commutated converter with the AC grid is inherently dependent, according to a characteristic curve relating reactive power to real power, on the real power transmitted by the converter. Reactive and real power therefore cannot readily be set independently of one another in the case of a line-commutated converter. More particularly, line-commutated converters can therefore also be used only to a very limited extent for power factor correction in the AC grid without changing the flow of real power.

There are admittedly ways of altering the exchange of reactive power with the AC grid in transmission mode by modulating the firing angle of a line-commutated converter. However, when the AC voltage or secondary voltage of a transformer unit coupling the converter to the AC grid is constant, this inevitably results in the DC-side voltage of the converter and hence the flow of real power for the whole connected HVDC transmission system also changing. Although this can be compensated for within narrow limits by locally moving the transformer secondary voltage by means of stepping switches, the converter is then operated at unnatural operating points that require complicated and costly equipment design. Since a movement of the transformer voltage furthermore takes place in the range of seconds, a transient reaction to reactive power changes with high dynamics is not possible in this case either.

SUMMARY OF THE INVENTION

The invention is based on the object of specifying a converter station for a power transmission via a bipolar high-voltage DC transmission link that is improved more particularly in respect of the exchange of reactive power with an AC grid and a method for operating such a converter station that is improved in respect of the exchange of reactive power.

The object is achieved according to the invention by a method having the steps described below and by a converter station having the features of described below.

Advantageous refinements of the invention are the subject matter of the subclaims.

The method according to the invention for operating a converter station having two line-commutated converters for a power transmission via a bipolar high-voltage DC transmission link involves the two converters being electrically connected to the same pole of the high-voltage DC transmission link in an antiparallel connection. One of the converters is operated as a rectifier on an AC grid, the other converter is operated as an inverter on the AC grid, and a station reactive power exchanged by the converter station with the AC grid is controlled by means of real power stipulations for converter real powers exchanged between the converters and the AC grid.

The invention thus provides for the two converters of the converter station in an antiparallel connection to be operated in monopolar fashion, that is to say on the same pole of the HVDC link. One of the converters is operated as a rectifier on the AC grid, that is to say that this converter takes real power from the AC grid. The other converter is operated as an inverter on the AC grid, that is to say that this converter transmits real power to the AC grid. The station reactive power exchanged by the converter station with the AC grid is controlled by means of real power stipulations for converter real powers exchanged between the converters and the AC grid.

The invention makes use of the fact that the station real power that the converter station exchanges with the AC grid is the difference between the converter real powers of the two converters, since one of the converters is operated as a rectifier and the other converter is operated as an inverter, whereas the station reactive power is the sum of the converter reactive powers. Since each converter reactive power is furthermore dependent on the respective converter real power in accordance with a characteristic curve, the station reactive power can be changed and controlled by changes in the converter real powers of the two converters without changing the station real power. By way of example, the station reactive power can be increased by virtue of the converter real powers for the rectifier and the inverter being increased by the same amount without the station real power changing. Suitable real power stipulations for the converter real powers can therefore set not only the station real power but also a station reactive power of the converter station.

Besides the conventional mode of operation of the converter station, in which the line-commutated converters are both operated as rectifiers or as inverters and on different poles of the HVDC link, the invention thus allows a further mode of operation, in which the converters are used to provide another grid system service of power factor correction in parallel with the HVDC transmission, similarly to when using self-commutated converters or a static var compensator (SVC).

One refinement of the invention provides for a reactive power setpoint value for the station reactive power to be prescribed and for a sum of converter reactive powers exchanged by the converters with the AC grid to be set to the reactive power setpoint value by means of the real power stipulations. This allows the station reactive power to be set to a setpoint value by means of the real power stipulations for the converter real powers of the converters.

A further refinement of the invention provides for a real power setpoint value of a station real power exchanged between the converter station and the AC grid to be prescribed and for the real power stipulations to set a difference between the converter real powers to the real power setpoint value. This allows a desired station real power to be set by means of the real power stipulations for the converter real powers of the converters.

A further refinement of the invention provides for a sudden reactive power change in the station reactive power caused by at least one AC filter at a grid connection of the converter station being connected or disconnected to or from the AC grid to be reduced by a change in the converter real powers that counteracts the sudden reactive power change at the time of the at least one AC filter being connected or disconnected. The connecting and disconnecting of AC filters at the grid connection allows an offset for the exchange of reactive power between the converter station and the AC grid to be changed. Without further measures, the connecting and disconnecting of AC filters causes a sudden reactive power change in the station reactive power, however. The aforementioned refinement of the method according to the invention provides for this sudden reactive power change to be reduced by a change in the converter real powers at the time of the connection or disconnection. This refinement of the invention also makes use of the fact that the contrasting operation of the converters allows the station reactive power to be influenced by the converter real powers without changing the station real power in the process.

A converter station according to the invention for a power transmission via a bipolar high-voltage DC transmission link comprises two line-commutated converters that in each case are operable either as a rectifier or as an inverter on an AC grid and electrically connectable to each of the two poles of the high-voltage DC transmission link. Further, the converter station has a control unit configured to control a station reactive power exchanged by the converter station with the AC grid by means of real power stipulations for converter real powers exchanged between the converters and the AC grid when both converters are connected to the same pole of the high-voltage DC transmission link in an antiparallel connection.

A converter station according to the invention allows performance of the method according to the invention with the aforementioned advantages. In comparison with a conventional converter station having line-commutated converters, only one circuit, allowing anti-parallelization of the two converters, and a control unit, configured to control the converter real powers of the antiparallel-connected converters in a manner according to the invention, are needed. Any already existing switching apparatuses of a converter station can be used for the circuit, an insulation level of these switching apparatuses needing to be increased to a high-voltage potential if required. Setup of the control unit can be realized by means of appropriate programming, for example. The additional hardware complexity for a converter station according to the invention is therefore relatively low in comparison with a conventional converter station having line-commutated converters. The invention can therefore also be used for upgrading existing bipolar converter stations having line-commutated converters if need be.

One refinement of a converter station according to the invention provides for each converter to be connected to one pole of the high-voltage DC transmission link directly and to be connectable to the other pole by means of a pole changing switch. This refinement of the invention is particularly advantageous if the converter station is connected to more than one further converter station via an HVDC link (known as multiterminal operation), since simple polarity reversal of the HVDC link is not possible in this case and there is therefore often provision for pole changing switches anyway.

A further refinement of the invention provides for the AC grid to be a three-phase AC grid. In this case, each converter can have for example twelve valve units arranged in a twelve-pulse bridge circuit consisting of two six-pulse bridge circuits, wherein each valve unit can have more particularly at least one thyristor. Furthermore, each converter can be connected to the AC grid by a transformer unit that has a primary winding, a first secondary winding and a second secondary winding for each phase of the AC grid, wherein the primary windings are connected to one another by a star connection, the first secondary windings are connected to one another by a delta connection, and the second secondary windings are connected to one another by a star connection. In such a design of the converters, each winding end of each first secondary winding is preferably connected to a first six-pulse bridge circuit of a converter, and/or a winding end of each second secondary winding that is averted from a star point of the star connection is connected to a second six-pulse bridge circuit of a converter. The aforementioned refinements of the invention relate to the prevailing design of HVDC links between three-phase AC grids. In these cases, more particularly converter stations having twelve-pulse converters and the further aforementioned properties have proved their worth, these therefore also being advantageous refinements of the present invention. However, it should be emphasized that the invention is not limited to three-phase AC grids and/or converters of the aforementioned type, but is also applicable to single-phase AC grids and/or six-pulse converters, for example.

The properties, features and advantages of this invention that are described above and the manner in which they are achieved will become clearer and more distinctly comprehensible in association with the description of exemplary embodiments that follows, these being explained in more detail in association with the drawings.

DETAILED DESCRIPTION OF THE INVENTION

Mutually corresponding parts are provided with the same reference signs in the figures.

Figure 1:
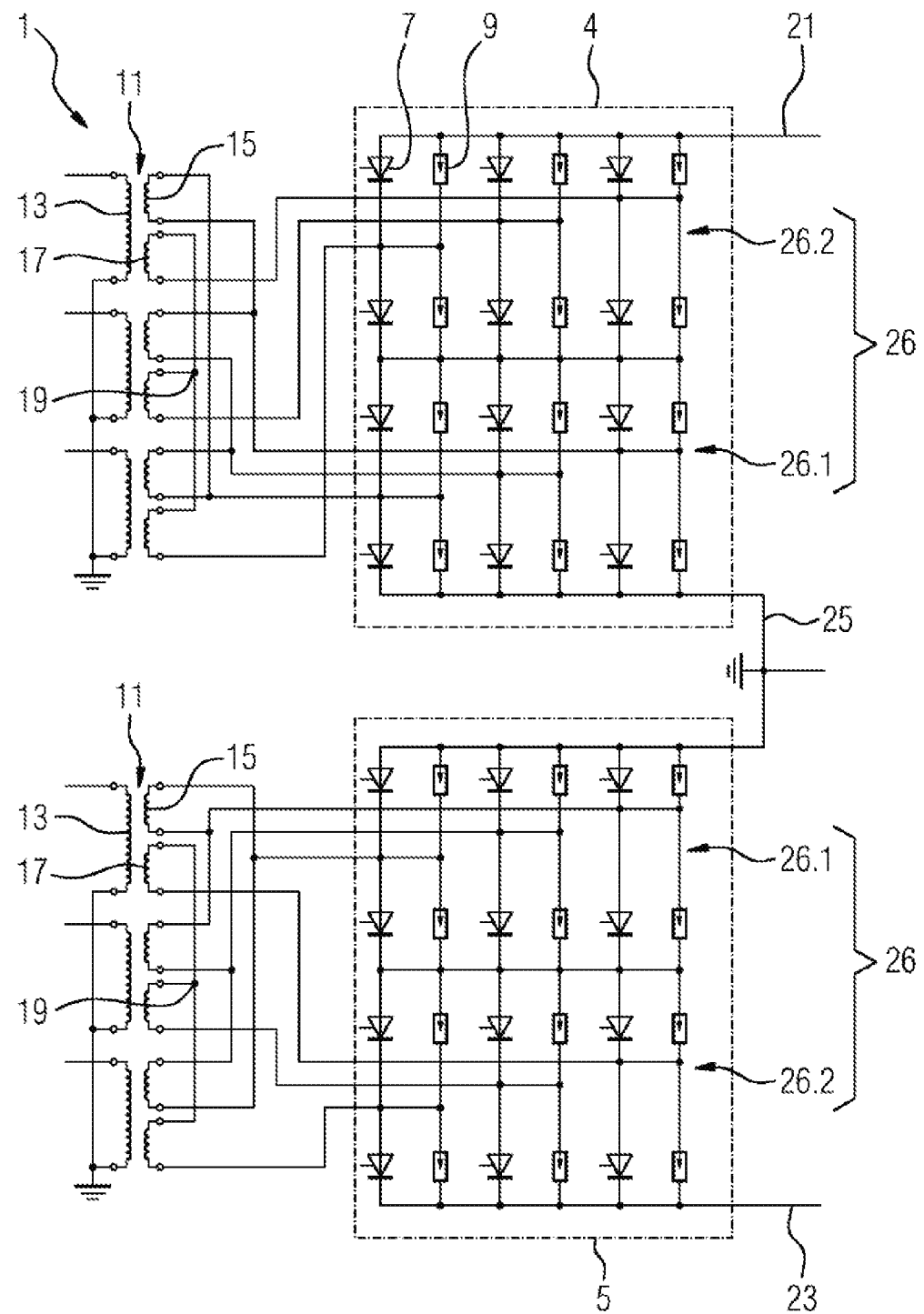
FIG. 1 shows a circuit diagram for a converter station based on the prior art.

FIG. 1 shows a circuit diagram for a converter station 1 based on the prior art for a power transmission via a bipolar HVDC link 30. The converter station 1 comprises two line-commutated converters 4, 5 (LCC) that are each operable either as a rectifier or as an inverter on a three-phase AC grid 27, 28, 29.

Each converter 4, 5 has twelve valve units 7 arranged in a twelve-pulse bridge circuit 26 consisting of two six-pulse bridge circuits 26.2, 26.2. Each valve unit 7 has one thyristor or multiple series- or parallel-connected thyristors. Each valve unit 7 has a surge arrester 9 connected in parallel with it.

Each converter 4, 5 is connected to the AC grid 27 by a transformer unit 11 that has a primary winding 13, a first secondary winding 15 and a second secondary winding 17 for each phase of the AC grid 27. The primary windings 11 of each transformer unit 11 are connected to one another by a star connection, the first secondary windings 15 are connected to one another by a delta connection, and the second secondary windings 17 are connected to one another by a star connection.

Each winding end of each first secondary winding 15 is connected to a first six-pulse bridge circuit 26.1 formed by six valve units 7. A winding end of each second secondary winding 17 that is averted from a star point 19 of the star connection is connected to a second six-pulse bridge circuit 26.2 formed by the other six valve units 7 of the respective converter 4, 5.

A first converter 4 is connected to a first pole 21 of the HVDC link 30. To this end, the second six-pulse bridge circuit 26.2 of the first converter 4 is connected to the first pole 21 of the HVDC link 30. The second converter 5 is connected to the second pole 23 of the HVDC link 30. To this end, the second six-pulse bridge circuit 26.2 of the second converter 5 is connected to the second pole 23 of the HVDC link 30. Furthermore, the two converters 4, 5 are connected to one another via a converter connecting line 25 designed for medium voltage. To this end, the first six-pulse bridge circuits 26.1 of both converters 4, 5 are connected to the converter connecting line 25.

Figure 2:
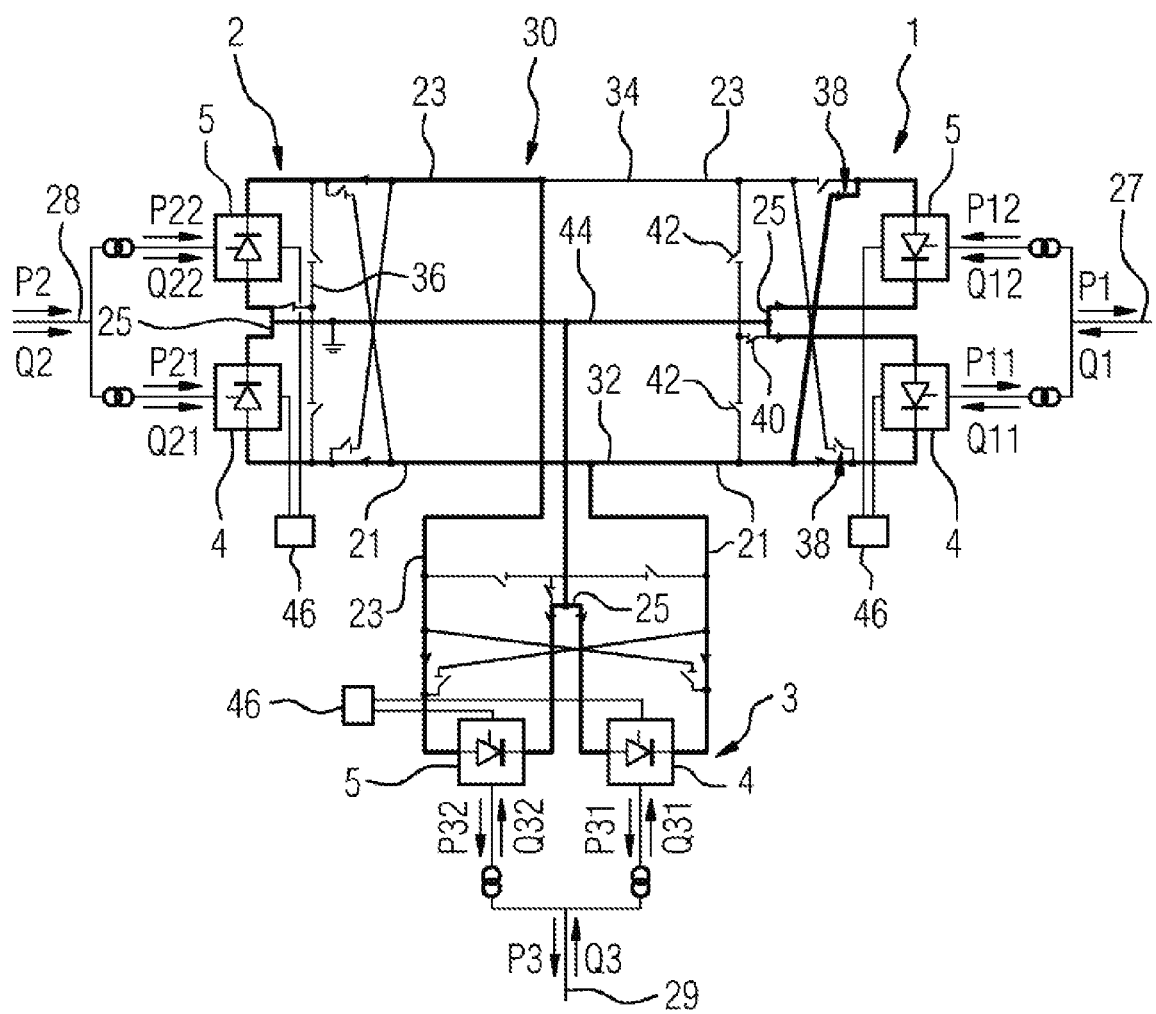
FIG. 2 schematically shows three converter stations connected via an HVDC link.

FIG. 2 schematically shows three converter stations 1, 2, 3 connected to one another on the DC side via an HVDC link 30. On the AC side, a first converter station 1 is connected to a first AC grid 27, a second converter station 2 is connected to a second AC grid 28 and a third converter station 3 is connected to a third AC grid 29.

The HVDC link 30 is in bipolar form with a first pole 21 and a second pole 23. The converter stations 1, 2, 3 are connected to one another via high-voltage lines 32, 34 of the HVDC link 30.

Each converter station 1, 2, 3 is designed in the manner of the converter station 1 depicted in FIG. 1, each of the two converters 4, 5 of each converter station 1, 2, 3 being selectively connectable to each of the two poles 21, 23 of the HVDC link 30. To this end, the outputs of each converter station 1, 2, 3 that are connected to a respective pole 21, 23 are connectable to one another via a pole connecting line 36 and two pole changing switches 38. The pole connecting line 36 of each converter station 1, 2, 3 is furthermore connectable to the converter connecting line 25 of the converter station 1, 2, 3 via a reconfiguration switch 40 and has an interrupter 42 between its connection to the reconfiguration switch 40 and each converter 4, 5 of the converter station 1, 2, 3. The converter connecting lines 25 of the converter stations 1, 2, 3 are connected to one another via medium-voltage lines 44. Each converter station 1, 2, 3 has a control unit 46 that actuates the valve units 7 of its converters 4, 5.

Each converter station 1, 2, 3 exchanges a station real power P1, P2, P3 and a station reactive power Q1, Q2, Q3 with the AC grid 27, 28, 29 to which it is connected, Pi and Qi denoting the station real power and the station reactive power of the converter station i (for i=1, 2, 3). The station real power Pi of the converter station i is obtained from the converter real power Pi1 of the first converter 4 of the converter station i and the converter real power Pi2 of the second converter 5 of the converter station i. Accordingly, the station reactive power Qi of the converter station i is obtained from the converter reactive power Qi1 of the first converter 4 of the converter station i and the converter reactive power Qi2 of the second converter 5 of the converter station i. The direction of each flow of real and reactive power is depicted in FIG. 2 by an arrow.

A first converter station 1 is operated in accordance with the method according to the invention. The two converters 4, 5 of the first converter station 1 are connected to the same pole 21, 23 of the HVDC link 30 in an antiparallel connection. One of the converters 4, 5 of the first converter station 1 is operated as a rectifier; the other converter 4, 5 of the first converter station 1 is operated as an inverter. The first converter station 1 is thus operated in monopolar fashion, that is to say only on one pole 21, 23 of the HVDC link 30. As explained in more depth below, this allows the method according to the invention to be used to control the station reactive power Q1 by means of the control unit 46 of the first converter station 1 by means of real power stipulations for the converter real powers P11 and P12.

In the example depicted, the two converters 4, 5 of the first converter station 1 are electrically connected to a first pole 21 of the HVDC link 30, the first converter 4 of the first converter station 1 being connected to the first pole 21 directly, while the second converter 5 of the first converter station 1 is connected to the first pole 21 by a pole changing switch 38. The first converter 4 is operated as an inverter, that is to say that it transmits the converter real power P11 to the first AC grid 27. The second converter 5 is operated as a rectifier, that is to say that it takes the converter real power P12 from the first AC grid 27. In the example depicted, it is assumed that P11 is greater than P12, which means that the first converter station 1 transmits the station real power P1=P11−P12 to the first AC grid 27. The converter reactive power Q11 exchanged by the first converter 4 with the first AC grid 27 and the converter reactive power Q12 exchanged by the second converter 5 with the first AC grid 27 add up to produce the station reactive power Q1=Q11+Q12 that is exchanged by the first converter station 1 with the first AC grid 27.

Since the converter reactive power Q11, Q12 exchanged by each of the two converters 4, 5 with the first AC grid 27 is dependent on the converter real power P11, P12 transmitted by this converter 4, 5 in accordance with a characteristic curve, the station reactive power Q1 exchanged by the first converter station 1 with the first AC grid 27 can be controlled by means of real power stipulations for the converter real powers P11, P12 of the converters 4, 5 of the first converter station 1 for a prescribed station real power P1. By way of example, the station reactive power Q1 can be increased by virtue of the converter real powers P11, P12 being increased, without the station real power P1 changing. This is made possible by the different operation of the antiparallel-connected converters 4, 5 as inverter and rectifier. According to the invention, a real power setpoint value of the station real power P1 and a reactive power setpoint value of the station reactive power Q1 are prescribed and the station real power P1 and the station reactive power Q1 are set to their respective setpoint value by means of real power stipulations for the converter real powers P11 and P12, wherein the real power stipulations set the difference between the converter real powers P11 and P12 to the real power setpoint value and the sum of the converter reactive powers Q11 and Q12 to the reactive power setpoint value.

A second converter station 2 and the third converter station 3 are each operated conventionally, that is to say that the two converters 4, 5 of each of these converter stations 2, 3 are connected to different poles 21, 23 of the HVDC link 30 and both converters 4, 5 are operated either as rectifiers or as inverters.

In the example depicted, the two converters 4, 5 of the second converter station 2 are operated as rectifiers that each take a converter real power P21 and P22 from the second AC grid 28. The second converter station 2 therefore takes the station real power P2=P21+P22 from the second AC grid 28. The converter reactive powers Q21 and Q22 of the converters 4, 5 of the second converter station 2 add up to produce the station reactive power Q2=Q21+Q22 that is exchanged by the second converter station 2 with the second AC grid 28.

The two converters 4, 5 of the third converter station 3 are operated as inverters that each transmit a converter real power P31 and P32 to the third AC grid 29. The third converter station 3 therefore transmits the station real power P3=P31+P32 to the third AC grid 29. The converter reactive powers Q31 and Q32 of the converters 4, 5 of the third converter station 3 add up to produce the station reactive power Q3=Q31+Q32 that is exchanged by the third converter station 3 with the third AC grid 29.

Besides the conventional mode of operation in which the second converter station 2 and the third converter station 3 are operated in the example shown in FIG. 2, the invention therefore allows a further mode of operation for the converter stations 1, 2, 3, in which the first converter station 1 is operated in this example and which also allows reactive power control of the station reactive power Q1 in addition to and in parallel with the HVDC transmission.

A development of the method according to the invention relates to the connecting or disconnecting of AC filters 54 at a grid connection 50 of a converter station 1, 2, 3 to or from an AC grid 27, 28, 29.

Figure 3:
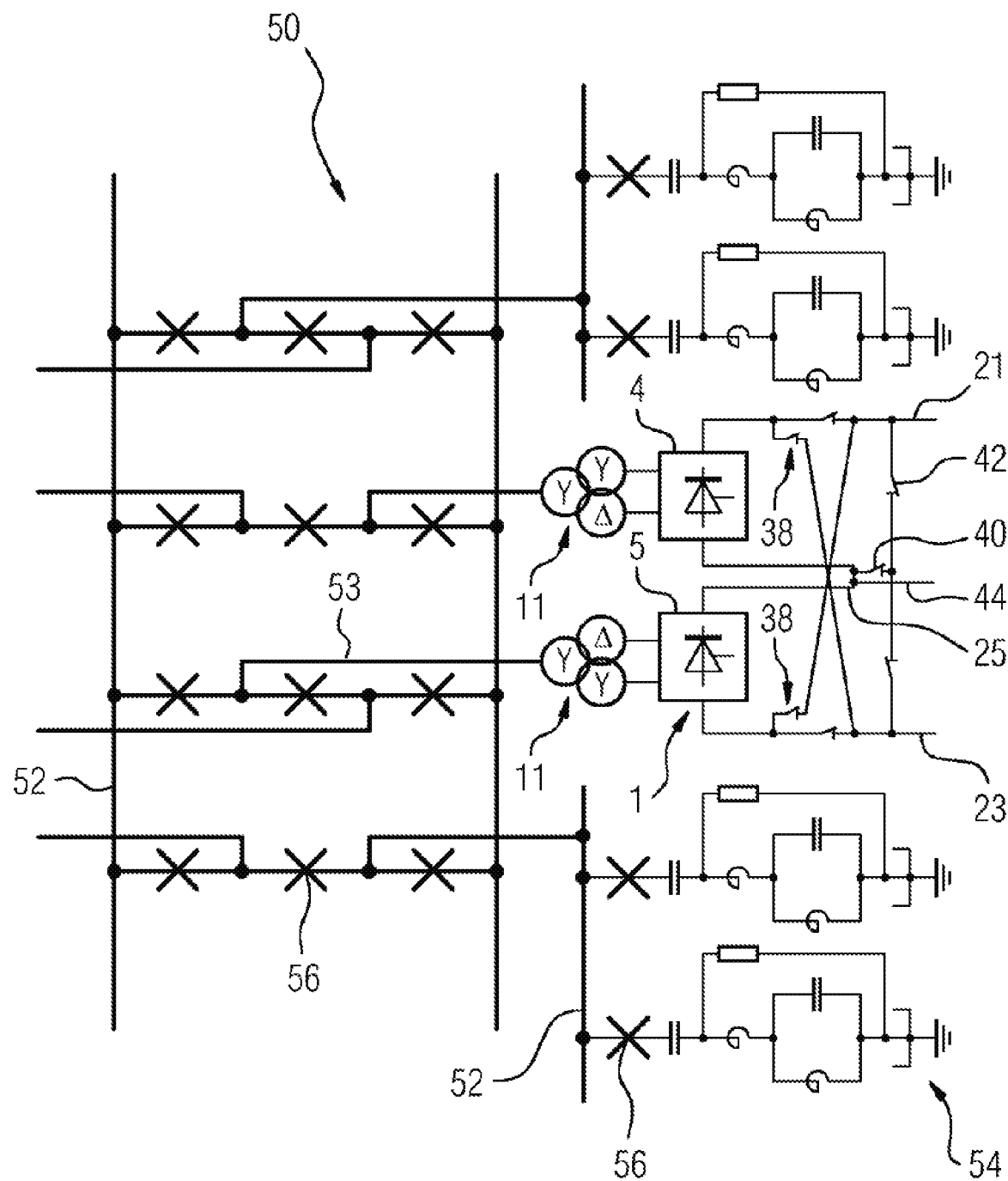
FIG. 3 shows a grid connection of a converter station to an AC grid.

FIG. 3 shows an exemplary embodiment of a grid connection 50 of a converter station 1 to an AC grid 27. The converter station 1 is designed in the manner of one of the converter stations 1, 2, 3 shown in FIG. 2. The grid connection 50 has multiple busbars 52, outgoing busbar feeders 53 and AC filters 54, which are interconnectable with one another by means of power switches 56. The connecting and disconnecting of AC filters 54 allows an offset for the exchange of reactive power between the converter station 1 and the AC grid 27 to be changed. The aforementioned development of the method according to the invention provides for a sudden reactive power change in the station reactive power Q1 caused by at least one AC filter 54 being connected or disconnected to be reduced by a change in the converter real powers P11, P12 of the converters 4, 5 of the converter station 1 that counteracts the sudden reactive power change at the time of the at least one AC filter 54 being connected or disconnected. In other words, the station reactive power Q1 of the converter station 1 is changed by a change in the converter real powers P11, P12 at the time of the at least one AC filter 54 being connected or disconnected such that this change at least partially compensates for the sudden reactive power change.

Figure 4:
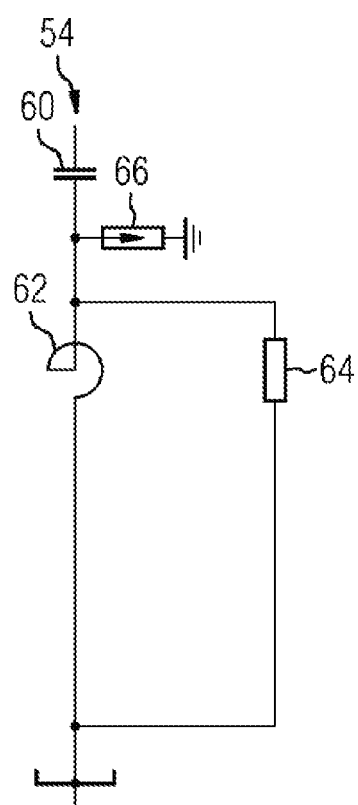
FIG. 4 shows a first embodiment of an AC filter.
Figure 5:
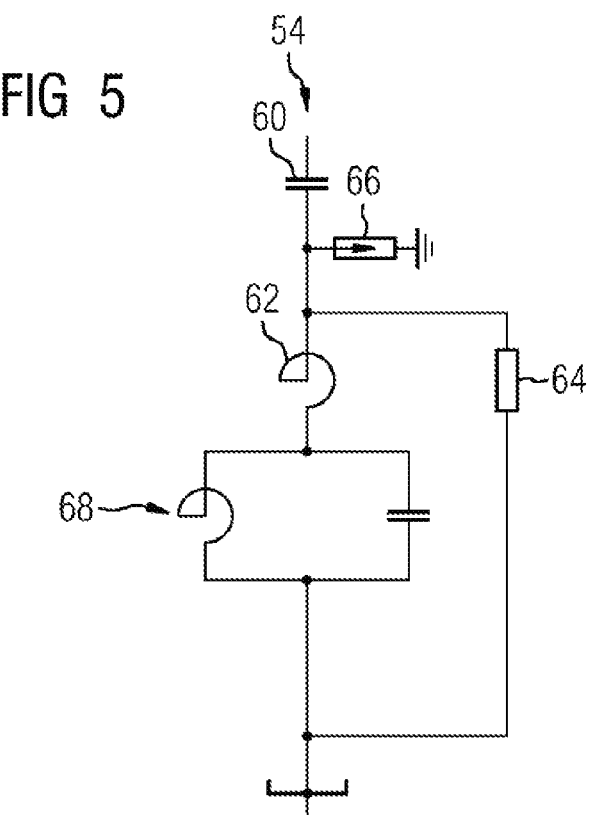
FIG. 5 shows a second embodiment of an AC filter.
Figure 6:
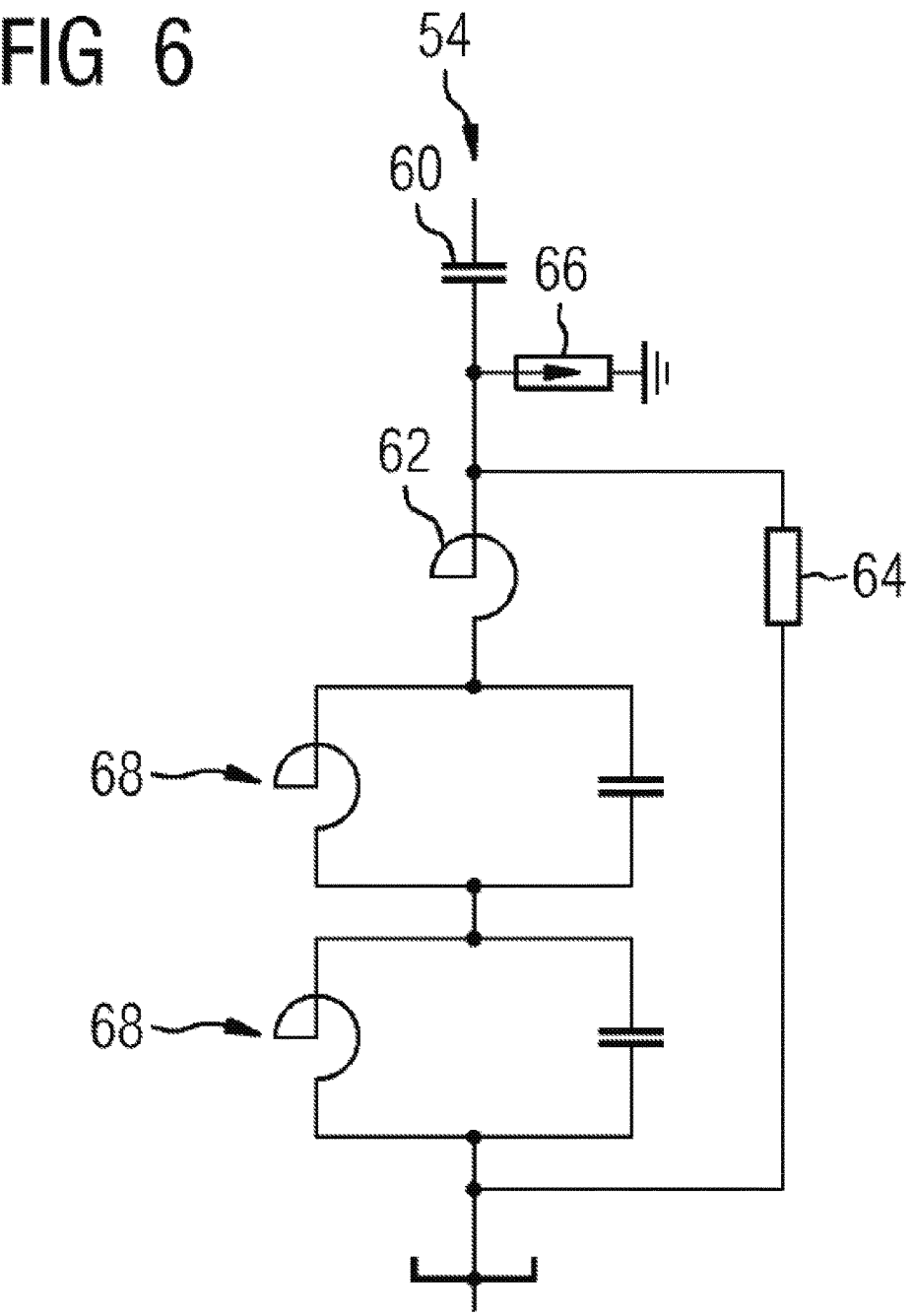
FIG. 6 shows a third embodiment of an AC filter.

FIGS. 4 to 6 show circuit diagrams for various embodiments of AC filters 54 that can be used at a grid connection 50.

FIG. 4 shows an AC filter 54 having a capacitor 60 and a parallel connection, connected in series with the capacitor 60, comprising a coil 62 and a resistor 64. The AC filter 54 moreover has a grounded filter surge arrester 66.

FIG. 5 shows an AC filter 54 that differs from the AC filter 54 shown in FIG. 4 only in that a series connection comprising a coil 62 and a resonant circuit 68 is connected in parallel with the resistor 64.

FIG. 6 shows an AC filter 54 that differs from the AC filter 54 shown in FIG. 4 only in that a series connection comprising a coil 62 and two resonant circuits 68 is connected in parallel with the resistor 64.

Although the invention has been illustrated and described more specifically in detail by means of preferred exemplary embodiments, the invention is not limited by the disclosed examples, and other variations can be derived therefrom by a person skilled in the art without departing from the scope of protection of the invention.

LIST OF REFERENCE SIGNS

1 to 3 converter station
4, 5 converter
7 valve unit
9 surge arrester
11 transformer unit
13 primary winding
15, 17 secondary winding
19 secondary-side star point
21, 23 pole
25 converter connecting line
26 twelve-pulse bridge circuit
26.1, 26.2 six-pulse bridge circuit
27 to 29 AC grid
30 high-voltage DC transmission link
32, 34 high-voltage line
36 pole connecting line
38 pole changing switch
40 reconfiguration switch
42 interrupter
44 medium-voltage line
46 control unit
50 grid connection
52 busbar
53 outgoing busbar feeder
54 AC filter
56 power switch
60 capacitor
62 coil
64 resistor
66 filter surge arrester
68 resonant circuit
P1 to P3 station real power
P11 to P32 converter real power
Q1 to Q3 station reactive power
Q11 to Q32 converter reactive power

The invention claimed is:

1. A method for operating a converter station, the method comprising the following steps:

electrically connecting two line-commutated converters to an identical pole of a bipolar high-voltage DC transmission link in an antiparallel connection, for power transmission through the high-voltage DC transmission link;

operating one of the converters as a rectifier on an AC grid;

operating another of the converters as an inverter on the AC grid;

controlling a station reactive power exchanged by the converter station with the AC grid by real power stipulations for converter real powers exchanged between the converters and the AC grid;

prescribing a real power setpoint value of a station real power exchanged between the converter station and the AC grid; and setting a difference between the converter real powers to the real power setpoint value by the real power stipulations.

* * * * *